No. 855,461. PATENTED JUNE 4, 1907.
G. LACZAY, C. FOHN & C. EKKER.
THRESHING MACHINE.
APPLICATION FILED DEC. 26, 1906.

2 SHEETS—SHEET 1.

Witnesses
J. J. Sheehy Jr.
N. C. Healy

Inventors
George Laczay,
Charles Fohn &
Charles Ekker.

By James J. Sheehy
Attorney

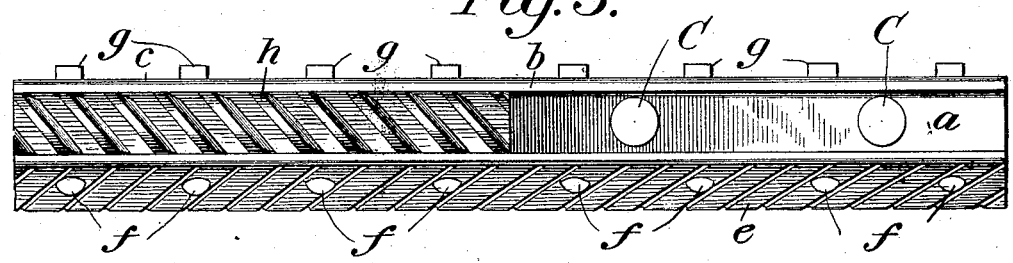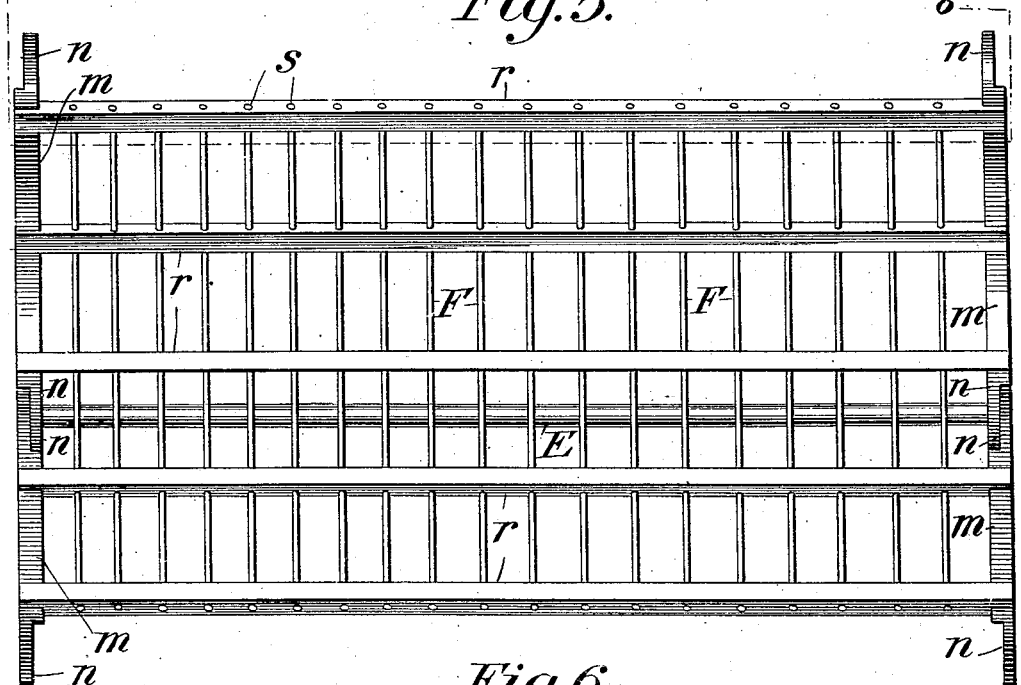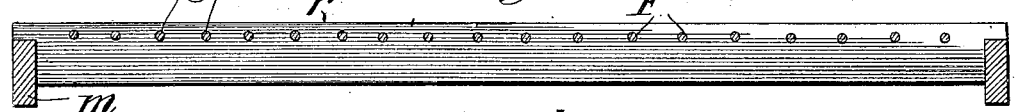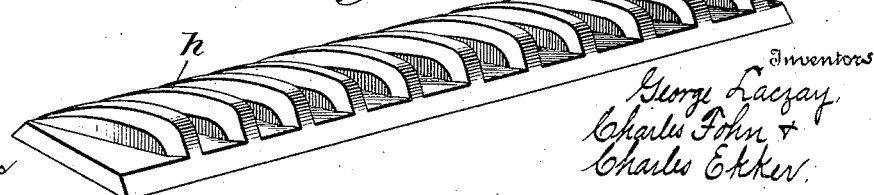

UNITED STATES PATENT OFFICE.

GEORGE LACZAY, CHARLES FOHN, AND CHARLES EKKER, OF HAMMOND, LOUISIANA.

THRESHING-MACHINE.

No. 855,461.    Specification of Letters Patent.    Patented June 4, 1907.

Application filed December 26, 1906. Serial No. 349,410.

*To all whom it may concern:*

Be it known that we, GEORGE LACZAY, a subject of the Emperor of Austria-Hungary, and CHARLES FOHN and CHARLES EKKER, citizens of the United States, residing at Hammond, in the parish of Tangipahoa and State of Louisiana, have invented new and useful Improvements in Threshing-Machines, of which the following is a specification.

Our invention has reference to cylinders and concaves for threshing machines; and it seeks to provide a cylinder and concave constructed with a view of increasing the capacity of a threshing machine of operating easily and smoothly and without breaking the grain or shaking the machine no matter how wet the grain may be, and of having their parts changed in position when wear takes place or replaced with new parts so as to prolong the usefulness of the structure as a whole.

Figure 1:
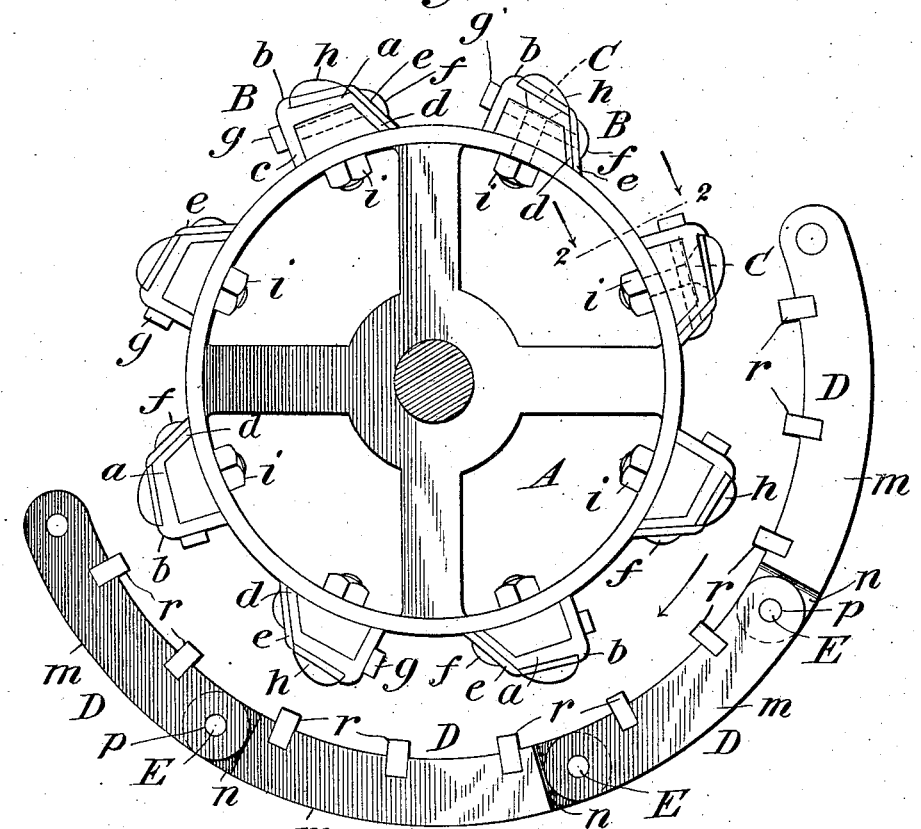
Figure 2:
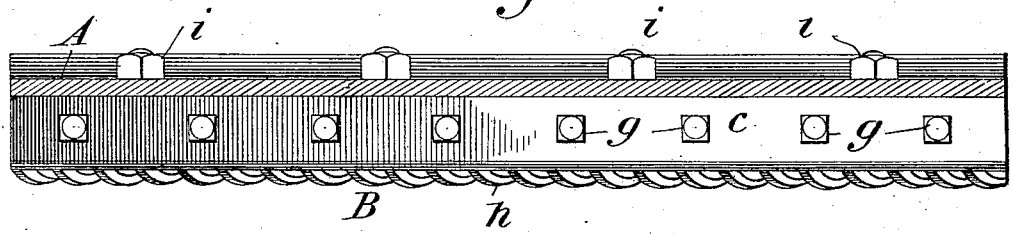

Other objects of the invention will be fully understood from the following description and claims when the same are read in connection with the accompanying drawings, forming part of this specification, in which:

Figure 1 is an end elevation of a cylinder and a concave constructed in accordance with our invention. Fig. 2 is a longitudinal section taken through the cylinder in a plane at one side of one rib, as indicated by the line 2—2 of Fig. 1. Fig. 3 is a plan view of one of the ribs of the cylinder. Fig. 4 is a perspective view of one of the toothed bars of the rib, removed. Fig. 5 is a detail plan view illustrating two of the sections of the concave as properly arranged relative to each other and connected together. Fig. 6 is a cross-section taken in the plane indicated by the line 6—6 of Fig. 5.

Similar letters designate corresponding parts in all of the views of the drawings, referring to which:

A is the body of the cylinder comprised in our improvements, and B B are longitudinal ribs arranged equi-distant on the periphery of the cylinder body, Fig. 1. As shown in Figs. 1 to 4, the ribs B respectively comprise a base $a$ having an undercut lip $b$ at its rear edge, with reference to the direction in which the cylinder rotates, and also having a right angle rear flange $c$ and an obtuse angle forward flange $d$ arranged to bear at their edges on the periphery of the cylinder body, a retaining plate $e$ arranged close against the forward side of the flange $d$ and projecting beyond the outer surface of the base $a$, eight (more or less) equi-distant bolts $f$ extending through the plate $e$ and the flanges $d$ and $c$ so as to detachably connect said strip to the flanges, and equipped with nuts $g$, and toothed bars $h$, of dovetail form in cross-section, removably arranged end to end in the dovetail seat formed by the base $a$ and its undercut lip $b$ in combination with the retaining plate $e$. The teeth of the bars $h$ are rib-like in form and extend diagonally of the bars as best shown in Fig. 4. The retaining plate $e$ when tightly connected to the base $a$, serves in combination with the undercut lip $b$ of the base to securely hold the toothed bars $h$ in proper position on the base, and yet when the connection between the retaining plate and the base is loosened, either one or both of the toothed bars $h$ may be readily removed. From this it follows that the toothed bars $h$ may be readily changed in position after wear takes place with a view of equalizing the wear and prolonging the usefulness of the diagonal, rib-like teeth of the bars, and when worn out both toothed bars may be readily removed and replaced with new toothed bars.

Each of the ribs B is connected to the cylinder body A through the medium of four (more or less) bolts C which extend through the rib base $a$ and the cylinder body A, and are equipped at the inner side of the latter with nuts $i$. By virtue of this construction it will be seen that when any one of the ribs B is in need of repair, the same may be quickly and easily detached from the cylinder body without affecting the other ribs. It should be noted in this connection, however, that it is not necessary to remove any one of the ribs B from the cylinder body A in order to reverse the toothed bars $h$ of such rib or replace said toothed bars $h$ with new toothed bars.

It will be gathered from the foregoing that the teeth of the bars $h$ are rib-like in form, and consequently are strong and durable; also, that the said rib-like teeth are not liable to break or otherwise damage the grain that is being threshed but on the other hand will work smooth and will not cause shaking of the threshing machine no matter how wet the grain may be. It will further be gathered that when desired, the retaining plates $e$ of the ribs B may be loosened to permit of the ready removal of accumulated dust, and that the said ribs B may be readily attached to and used on cylinder bodies such as at present in use.

Inasmuch as the rib-like teeth of the bars $h$ are adapted to work smoothly and easily, it follows that a threshing machine equipped with our improvements requires but a minimum amount of boiler power for its proper operation, and that the thresher is adapted to cleanly separate a large quantity of grain from straw in a short space of time.

In combination with the cylinder described in the foregoing, we employ the concave illustrated in Figs. 1, 5 and 6. This concave comprises four (more or less) sections D, transverse rods E detachably connecting the sections D together, and wires F which latter have for their office to prevent the long straw falling through the concave, while permitting the grain to pass, thus effecting the separation of the grain from the straw without bunching the straw or liability of the grain being carried along with the straw. Each of the concave sections D comprise side bars $m$ having their ends rabbeted, as indicated by $n$, to lap the rabbeted ends of the side bars on adjoining sections, and apertured, as indicated by $p$, to receive the rods E, and transverse beater bars $r$ which extend between and are connected to the side bars $m$ and are provided with apertures $s$ for the passage of the wires F.

By virtue of the construction of the concave as described in the foregoing, it will be observed that the concave as a whole is reversible or adapted to be changed in position to present new edges of the beater bars $r$ to the ribs B on the cylinder; also, that any one of the sections D can be removed for repair without disturbing the other sections, and that any one of the sections may be reversed or changed end for end so as to present fresh edges of the beater bars $r$ to the ribs on the cylinder, and in that way prolong the usefulness of the section and the concave as a whole.

In addition to the advantages hereinbefore ascribed to the different features of our novel cylinder and concave, it will be noted that both cylinder and concave are simple and inexpensive in construction, and that neither embodies delicate parts such as are liable to get out of order after a short period of use.

Having described my invention, what I claim and desire to secure by Letters-Patent, is:

1. A threshing machine cylinder having a body and ribs on the body respectively comprising a base fixed to the body and having an undercut lip at one side, a retaining plate arranged at the opposite side of the base and serving in connection with the undercut lip to form a seat of dovetail form in cross-section, means detachably connecting the retaining plate to the base, and a toothed bar, of dovetail form in cross-section, removably arranged on the base and in the dovetail seat formed by the lip thereof and the retaining plate.

2. A threshing machine cylinder having a body and ribs on the body respectively comprising a base fixed to the body and having an undercut lip at one side, a retaining plate arranged at the opposite side of the base and serving in connection with the undercut lip to form a seat of dovetail form in cross-section, means detachably connecting the retaining plate to the base, and bars, of dovetail form in cross-section, removably arranged end to end on the base and in the dovetail seat formed by the lip thereof and the retaining plate and having rib-like teeth extending diagonally across their outer ends.

3. A threshing machine cylinder having a body, in combination with ribs arranged on and extending longitudinally of the body; the said ribs comprising a base having a right angle flange at its rear edge and an obtuse angle flange at its forward edge and also having an under cut lip adjacent to its rear side, a retaining plate arranged at the forward side of the base and serving in combination with the under cut lip to form a seat of dovetail form in cross-section, bolts extending through the retaining plate and both flanges of the base and detachably connecting the base and plate, and a toothed bar, of dovetail form in cross-section, removably arranged in said dovetail seat, and bolts disposed at right angles to the first mentioned bolts and detachably connecting the bases of the ribs to the cylinder body.

4. A threshing machine cylinder having a body and a rib on the body, comprising a seat of dovetail form in cross-section, and a bar of dovetail form in cross-section, removably arranged in said seat and having rib-like teeth.

In testimony whereof we have hereunto set our hands in presence of two subscribing witnesses.

GEORGE LACZAY.
CHARLES FOHN.
CHARLES EKKER.

Witnesses:
Jos. N. Enmons,
Geo. W. Kendall.